H. A. GLASRUD & J. ANDERSON.
WHEEL.
APPLICATION FILED AUG. 13, 1907.

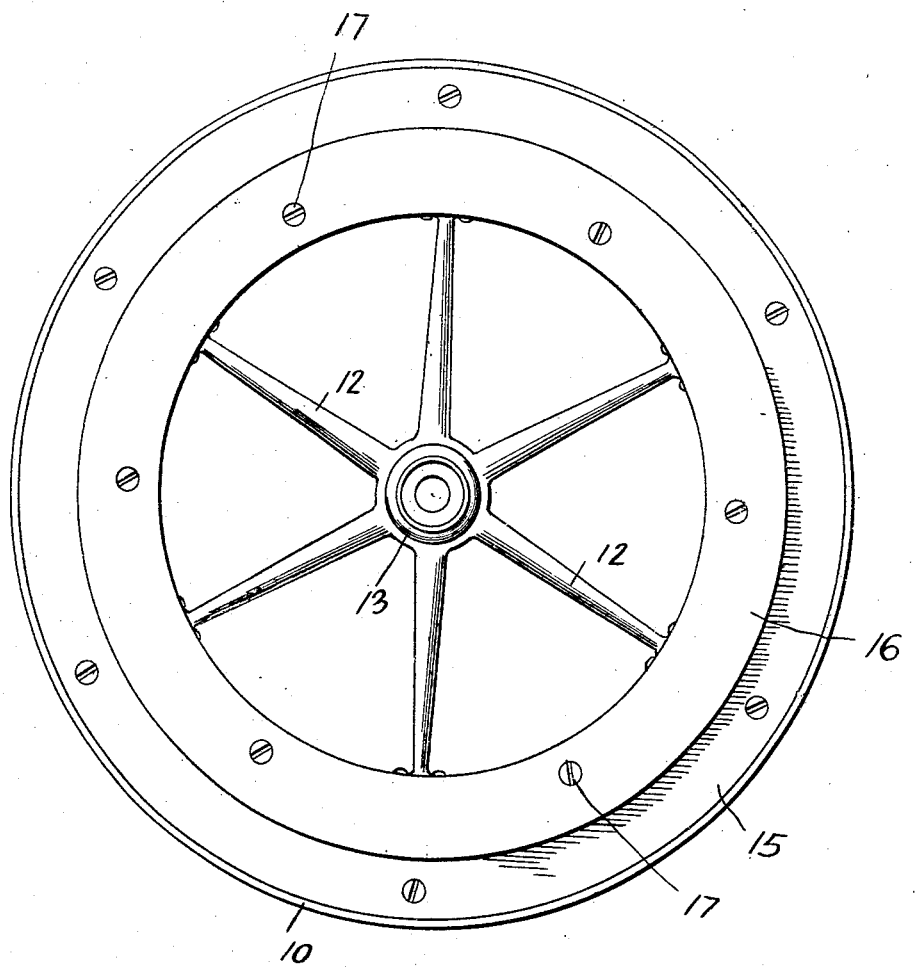

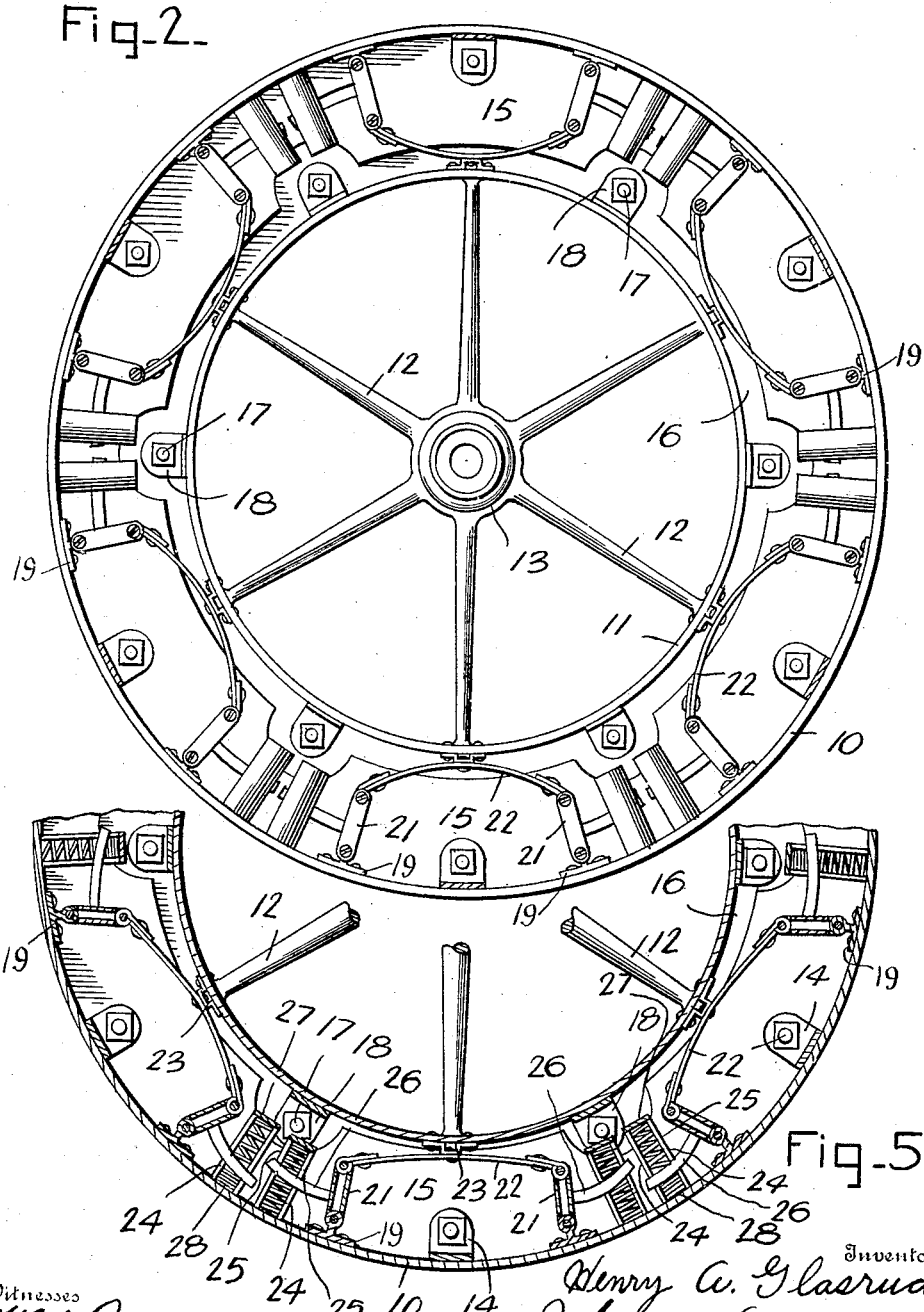

914,942.

Patented Mar. 9, 1909.
4 SHEETS—SHEET 3.

H. A. GLASRUD & J. ANDERSON.
WHEEL.
APPLICATION FILED AUG. 13, 1907.

914,942.

Patented Mar. 9, 1909.
4 SHEETS—SHEET 4.

Witnesses
W. H. Rockwell
M. J. Miller

Inventors
Henry A. Glasrud
Johannes Anderson
By
Attorneys

UNITED STATES PATENT OFFICE.

HENRY A. GLASRUD AND JOHANES ANDERSON, OF HATTON, NORTH DAKOTA; SAID GLASRUD ASSIGNOR TO OSCAR T. PETTERSON, OF NORTHWOOD, NORTH DAKOTA.

WHEEL.

No. 914,942.        Specification of Letters Patent.        Patented March 9, 1909.

Application filed August 13, 1907. Serial No. 388,364.

*To all whom it may concern:*

Be it known that we, HENRY A. GLASRUD and JOHANES ANDERSON, citizens of the United States, residing at Hatton, in the county of Traill, State of North Dakota, have invented certain new and useful Improvements in Wheels; and we do hereby declare the following to be a full, clear, and exact description of the invention, such as will enable others skilled in the art to which it appertains to make and use the same.

This invention relates to vehicle wheels and more particularly to that class of wheels which are designed principally for use upon automobiles.

More specifically stated, the invention is a spring wheel and we have in view the provision of a wheel of this class which, while it embodies all of the advantages of a pneumatic tire wheel and all the resiliency and cushion effect apparent therein, will not present the same disadvantages to be found in rubber tire wheels.

In carrying out our invention we provide a wheel of this class having an inner and an outer rim between which are interposed spring devices which coöperate to render the wheel suitably yieldable but at the same time prevent any rotation of one rim with respect to the other such as is apparent in wheels of this class which employ but a single set of spring devices.

Figure 6:
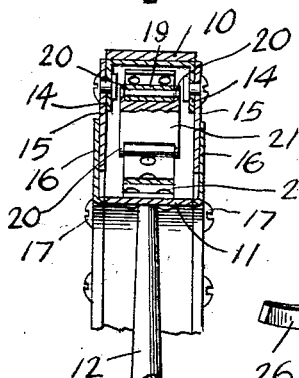
Figure 8:
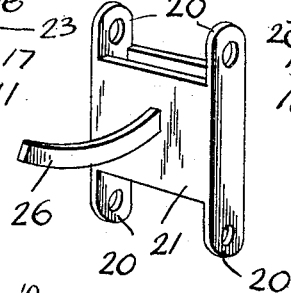
Figure 7:
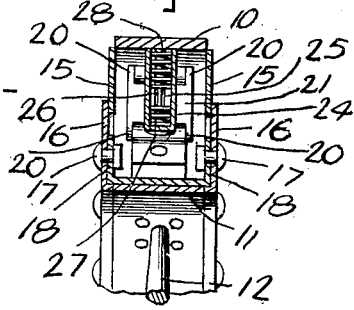
Figure 3:
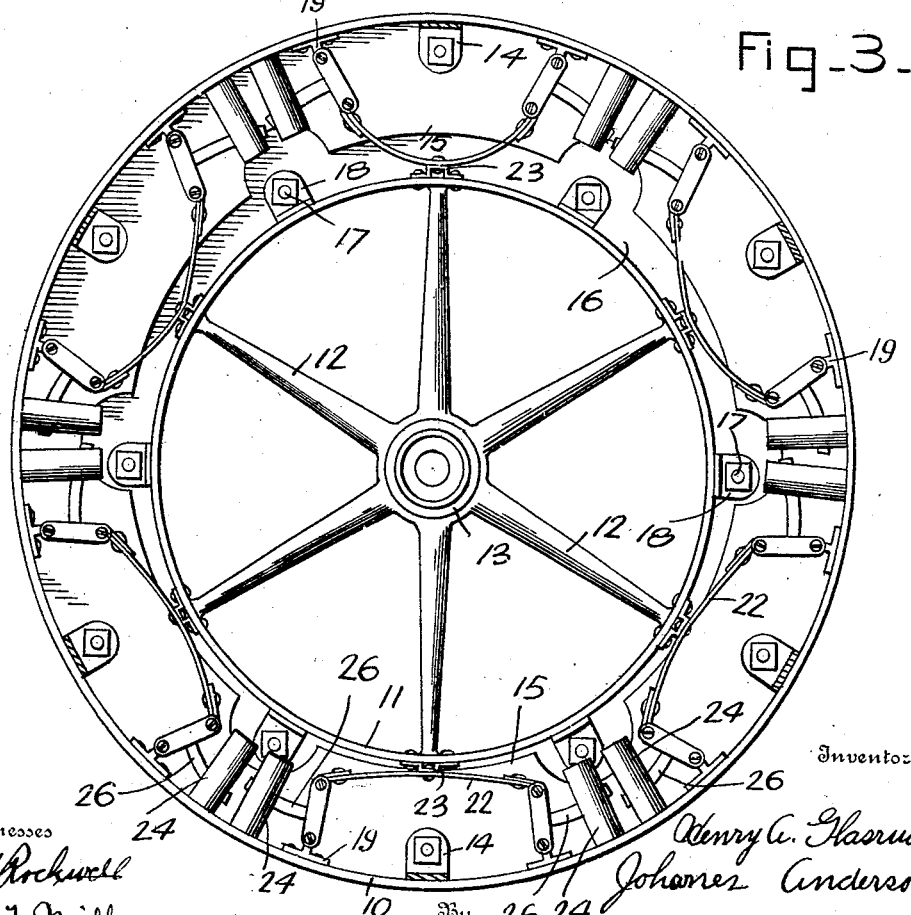
Figure 4:
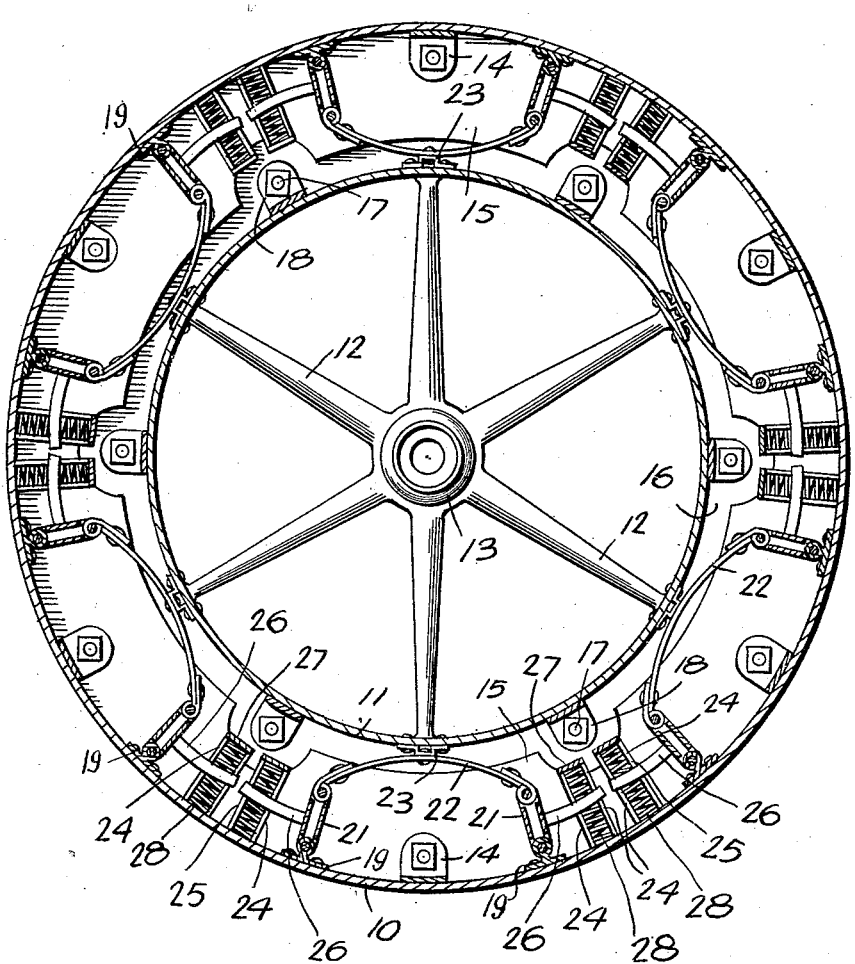

In the accompanying drawings, Figure 1 is a side elevation of a wheel constructed in accordance with our invention, Fig. 2 is a similar view but with the inner side of the wheel casing removed and showing the position assumed by the several elements at a time when there is no weight upon the wheel, Fig. 3 is a view similar to Fig. 2 but showing the positions of the several elements when a weight is supported by the wheel, Fig. 4 is a vertical longitudinal sectional view through the wheel, parts being in the position shown in Fig. 2, Fig. 5 is a similar view but of only a portion of the wheel showing the relative positions of the elements of the correlated spring devices of the wheel under the conditions named in the description of Fig. 3, Fig. 6 is a vertical sectional view in detail taken axially through a portion of the wheel, Fig. 7 is a similar view but taken in a plane through one of the cylinders, and, Fig. 8 is a detail perspective view of one of the links to which the leaf springs are connected.

In the drawings the wheel is shown as comprising an outer rim 10 and an inner rim 11, these rims being normally concentrically arranged with respect to each other. Spokes 12 radiate from a head 13 and are secured at their outer ends to the inner rim 11. Formed at each edge of the outer rim 10 and extending inwardly at right angles to the said rim are pairs of ears 14 to which are bolted or otherwise secured annular flanges 15, there being two such flanges one at each side of the wheel. Similar flanges 16 are secured one at each side of the inner rim 11 by means of bolts 17 which are engaged through the said flanges 16 and through ears 18 formed integral with and extending outwardly and radially from the sides of the inner rim 11. The said flanges 15 upon the outer rim are slidably received between the flanges 16 upon the inner rim and it will be observed in effect a wheel having relatively movable sections is provided.

Formed at equidistant points upon the inner periphery of the outer rim 10 are pintle lugs 19 and these lugs are received between ears 20 formed at the outer ends of links 21, there being a bolt engaged through the ears of each link and through the pintle lug and threaded at one of its ends for threaded engagement in one of the ears whereby it will be held against accidental displacement. Pivoted in a similar manner at their ends to pairs of links are leaf springs 22 and these leaf springs are secured at their middles to U-shaped brackets 23 which brackets are riveted or otherwise secured to the inner rim 11 of the wheel.

It will be understood from the foregoing description that as the wheel rotates, the weight supported thereby will tend to flatten out the lower springs and vary the arc of curvature of the other springs, the wheel rims at this time being eccentric to each other. It is evident however that these springs alone will not prove satisfactory for the reason that as the links are hinged, there would be nothing to prevent turning movement of the two rims and I have therefore provided a means for accomplishing this result which means will now be described.

Secured at their outer ends to the inner periphery of the outer rim 10 of the wheel intermediate the adjacent links of each two pairs is a pair of cylinders 24. Each of these cylinders is provided at opposite sides with slots 25 and fingers 26 are formed upon the outer face of each link and project through the slots of the adjacent cylinder. The inner end of each of the cylinders is closed as at 27 and arranged within each of the cylinders is a pair of springs 28 between the opposing ends of which the ends of the corresponding fingers 26 are received.

As is clearly shown in Figs. 3 and 5 of the drawings, when the wheel is in such position that one of the springs 22 is at the bottom this spring will be flattened out to a certain degree and the spring at the top of the wheel or rather at a point diametrically opposite to the spring first mentioned will be curved to a greater degree than normally, the springs intermediate these two springs having their arcs varied to a greater or less degree. As each of the springs 22 is flattened out, the links which the spring connects will be swung in opposite directions and from each other and the fingers carried thereby will be moved outwardly against the tension of the outer springs 28 within the adjacent cylinders. The springs 22 next adjacent the spring which is flattened out will be bent from their normal position and the fingers upon the links of these last mentioned springs nearer the first mentioned springs will be swung in a direction corresponding to the direction of movement of the fingers upon the first mentioned links whereas the fingers upon the other links of the last mentioned springs will be moved in an opposite direction and against the tension of the inner springs of the corresponding cylinders.

From the foregoing description of our invention it will be observed that the springs 22 serve to yieldingly hold the two rims of the wheel in concentric relation and that the springs 28 within the cylinders coöperate with the fingers upon the links to arrest any tendency toward relative rotation of the rims and to a certain degree coöperate in the production of the result designed to be attained by the springs 22.

What is claimed, is—

1. A wheel of the class described, comprising an outer and an inner rim, flanges secured at the sides of the two rims, the flanges upon one rim being received between those of the other rim, links hinged to the inner periphery of the outer rim, leaf springs secured at their ends to the inner or free ends of the links, the said springs being secured at their middles to the inner rim, fingers formed upon the links, and opposed compressible springs between which the ends of the fingers are received.

2. A wheel of the class described comprising an outer and an inner rim, flanges secured at the sides of the two rims, the flanges upon one rim being received between those of the other rim, links hinged to the inner periphery of the outer rim, leaf springs secured at their ends to the inner or free ends of the links, the said springs being secured at their middles to the inner rim, fingers formed upon the links, cylinders carried by the outer rim and projecting inwardly and radially therefrom, the said cylinders being slotted, and opposed springs located within each of said cylinders, the fingers being projected at their ends between the said springs.

3. A wheel of the class described comprising an outer and inner rim, links hinged to one of said rims, springs secured at their ends to the free ends of the links, the said springs being secured at their middles to the other rim, fingers projecting from said links and opposed springs arranged to bear against said fingers and resist the movement of said links.

4. A wheel of the class described comprising an outer and an inner rim, links hinged to the inner periphery of the outer rim, leaf springs secured at their ends to the inner or free ends of the links, the said springs being secured at their middles to the inner rim, fingers formed upon the links, and opposed compressible springs between which the ends of the fingers are received.

In testimony whereof, we affix our signatures, in presence of two witnesses.

HENRY A. GLASRUD.
JOHANES ANDERSON.

Witnesses:
A. HANSON,
K. A. SASHER.